May 15, 1956
L. SAIVES
2,745,526
TRANSMISSION AND ENGINE BRAKE INTERLOCK
MECHANISM IN AUTOMOTIVE VEHICLES
Filed April 25, 1951
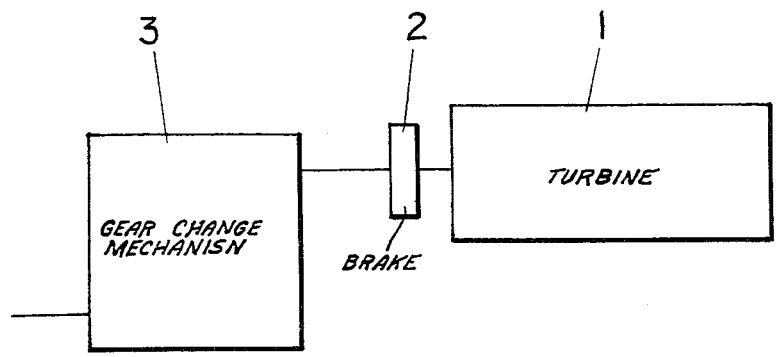
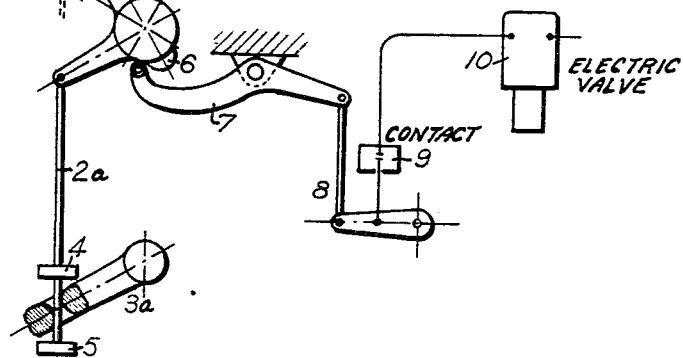
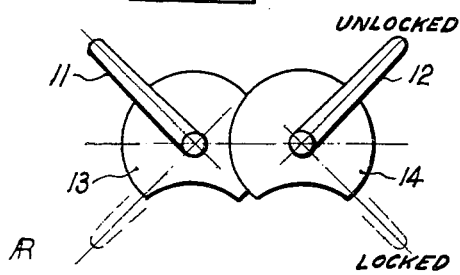
Inventor
Leon Saives
By Robert E. Burns
Attorney United States Patent Office 2,745,526
Patented May 15, 1956

2,745,526

TRANSMISSION AND ENGINE BRAKE INTERLOCK MECHANISM IN AUTOMOTIVE VEHICLES

Léon Saives, Billancourt, France, assignor to Regie Nationale des Usines Renault, Billancourt, France Application April 25, 1951, Serial No. 222,842

Claims priority, application France May 24, 1950

4 Claims. (Cl. 192—4)

This invention relates to an automobile vehicle driven by one or more gas turbines, in which the turbine or turbines may in particular be supplied with gases by one or more gas generators having free pistons. The transmission of the movement of the turbine or turbines to the driving axles is mechanical or hydro-mechanical.

The vehicle comprises one or more turbines having a single direction of rotation, and the reversal of the drive is obtained by means of a suitable mechanical device.

The present invention is characterised in that there is provided a device for braking the turbine or turbines during the operation of reversing or changing gear, while the control of this device may be automatic or otherwise.

For this purpose there may be installed a locking system between the reversing and turbine braking controls, rendering impossible the operation of the reversing control if the turbine brake is not applied.

Different embodiments of a device according to the invention are illustrated in the accompanying drawing in which:

Fig. 1 is a diagrammatic representation of an automotive driving mechanism in accordance with the invention. Fig. 2 is an elevational view partly diagrammatic of an engine braking and gear changing arrangement embodying features of the present invention. Fig. 3 is an elevational view of another embodiment of the invention.

Referring to the drawing, Fig. 1 shows diagrammatically a turbine 1. The output shaft of the turbine, or of its reduction gear, carries a brake drum 2 between the output of the turbine and the input of the reversing device 3. The brake is of any known type, either of the shoe type or of the band type, or a magnetic brake, but this enumeration is not limitative. The control of the brake is for example obtained by a compressed air cylinder controlled by an electric valve (Fig. 2).

In Fig. 2 is shown an arrangement in accordance with the invention for operating by a single motion the gear change mechanism 3 and the braking mechanism on the turbine 1 so that when the gear change is made the turbine will be automatically braked. As shown in Fig. 2 a gear control lever 1a operates the reversing lever 3a through a connecting rod 2a which is provided with spaced stops 4 and 5 which permit a certain amount of lost motion between the movements of lever 1a and lever 3a. When it is desired to change gears, the lever 1a is moved from the position AV to the position AR. This movement raises connecting rod 2a and lever 3a and effects the desired gear change.

The control lever 1a formed with a cam 6 which is adapted to engage the end of one arm of a pivoted lever 7, the opposite arm of which is connected to a rod 8 which in turn is connected to a further lever for actuating an electrical contact 9. The electrical contact 9 controls an electric valve 10 which operates a compressed air cylinder or other means for actuating the turbine brake. When the control lever 1a is pivoted to change the gears, the cam 6 engages the arm of lever 7 which through the connecting rod 8 closes contact 9. The closing of contact 9 energizes electric valve 10 and applies the brake to the turbine. When the control lever 1a is in the position AR, the cam 6 is on the opposite side of the end of lever 7 so that upon disengagement with lever 7, the contact 9 is opened and the brake is disengaged. When the lever arm 1a is returned to the position AV, the cam 6 again engages the lever 7 and the turbine brake is applied until the lever 1a has reached its final position and the gear change has been effected.

Fig. 2 thus shows an automatic arrangement for simultaneously changing the gears and braking the engine during the period of the change. Fig. 3 shows a simplified arrangement in accordance with the invention applicable when the gear changing and brake application are effected manually. In the arrangement shown in Fig. 3, the reversing control lever 11 and the brake control lever 12 are integral with notched cams 13 and 14, respectively, which inter-engage in such manner that the reversing lever cannot be moved until the braking lever has first been moved to braking position.

It is to be clearly understood that the arrangements shown in Figures 2 and 3 are given by way of example, but that use may be made of any other system giving the same result.

Naturally, everything that has been said with regard to the reversing control may be applied to the gear changing control without thereby departing from the scope of the invention.

I claim:

1. In an automotive vehicle having a gas turbine driving means, a transmission mechanism from said driving means to the driven portion of the vehicle, a gear changing mechanism in said transmission mechanism, means for actuating said gear changing mechanism and braking means operable upon said gas turbine driving means while said driving means is in driving relationship with said transmission mechanism, said gear actuating means and said braking means being arranged for inter-dependent actuation whereby said braking means is actuated each time said gear changing means is to be actuated, but said braking means acts upon said driving means to brake said driving means before said gear changing mechanism is actuated.

2. In an automotive vehicle having a gas turbine driving means, a transmission mechanism from said driving means to the driven portion of the vehicle, a gear changing mechanism in said transmission mechanism, means for actuating said gear changing mechanism, and braking means operable upon said gas turbine driving means while said driving means is in driving relationship with said transmission mechanism for braking said driving means during actuation of said gear changing means, said braking means and said means for actuating said gear change means being in interlocking relationship and said braking means acting upon said driving means to brake said driving means before said gear changing mechanism is actuated.

3. An automotive vehicle as defined in claim 1 wherein said gear actuating means includes a first lever and a second lever connected by a lost motion link and said braking means includes a third lever engageable by said first lever to apply said brake upon movement of said first lever and simultaneous movement of said second lever.

4. An automotive vehicle as defined in claim 1 wherein said gear changing mechanism includes a first actuating lever and said braking means includes a second actuating lever, said levers being formed with notched cams inter-engaged in such manner that said first lever is movable only after predetermined movement of said second lever, whereby the gear changing mechanism can be actuated only after the braking means has been actuated.

References Cited in the file of this patent

UNITED STATES PATENTS

| | | |
|---|---|---|
| 1,784,354 | Haussman | Dec. 9, 1930 |
| 1,898,569 | Pearson | Feb. 21, 1933 |
| 2,156,118 | Kliesrath | Apr. 25, 1939 |
| 2,330,580 | Hautsch | Sept. 28, 1943 |
| 2,421,206 | Kylin et al. | May 27, 1947 |
| 2,467,513 | Welsh | Apr. 19, 1949 |
| 2,469,743 | Newton | May 10, 1949 |